US008536920B2

(12) United States Patent
Shen

(10) Patent No.: US 8,536,920 B2
(45) Date of Patent: Sep. 17, 2013

(54) CLOCK CIRCUIT WITH DELAY FUNCTIONS AND RELATED METHOD

(75) Inventor: Ming-Feng Shen, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 260 days.

(21) Appl. No.: 12/834,904

(22) Filed: Jul. 13, 2010

(65) Prior Publication Data

US 2011/0012660 A1     Jan. 20, 2011

(30) Foreign Application Priority Data

Jul. 16, 2009   (TW) .............................. 98124080 A

(51) Int. Cl.
     *H03H 11/26*      (2006.01)

(52) U.S. Cl.
     USPC .......................................... 327/261; 327/269

(58) Field of Classification Search
     USPC .................. 327/261, 269, 284, 290
     See application file for complete search history.

(56) References Cited

U.S. PATENT DOCUMENTS

| | | |
|---|---|---|
| 4,868,522 A | 9/1989 | Popat et al. |
| 6,073,246 A | 6/2000 | Song |
| 6,229,368 B1 * | 5/2001 | Lee ................................. 327/292 |
| 6,542,005 B2 * | 4/2003 | Yamamoto ....................... 326/93 |
| 6,574,781 B1 * | 6/2003 | Harada et al. ................. 716/114 |
| 6,741,122 B2 * | 5/2004 | Kapoor et al. ................ 327/564 |
| 7,005,907 B2 * | 2/2006 | Ibuka ............................ 327/295 |
| 8,179,181 B2 * | 5/2012 | Lung et al. .................... 327/276 |

FOREIGN PATENT DOCUMENTS

CN      1866234 A      11/2006

OTHER PUBLICATIONS

David A. Hodges et al., "analysis and design of digital integrated circuits in deep submicron technology", Third Edition, Publishing House of Electronics Industry, Beijing, Sep. 2005, cover page+ p. 341-p. 344, Translation.

* cited by examiner

*Primary Examiner* — Hai L Nguyen
(74) *Attorney, Agent, or Firm* — McClure, Qualey & Rodack, LLP

(57) ABSTRACT

A clock circuit with delay functions includes a first clock tree and a delay module. The first clock tree provides a first clock signal and includes a first clock root and a plurality of first sub-trees. The delay module is coupled to the first clock root or a designated sub-tree among the plurality of first sub-trees for delaying the first clock signal. The delay module includes at least two delay segments, wherein each delay segment includes a delay and a connection net. The delay time caused by each delay segment is substantially the same.

24 Claims, 5 Drawing Sheets

| Type of Delay | INVCKQHD | | INVCKNHD | | INVCKMHD | |
|---|---|---|---|---|---|---|
| Size of Delay | 10.4 × 3.2 | | 5.2 × 3.2 | | 4.4 × 3.2 | |
| | Transition Time | Delay Time | Transition Time | Delay Time | Transition Time | Delay Time |
| Length of Connection Net 0μ m | 0.04 ns | 0.029 ns | 0.04 ns | 0.031 ns | 0.04 ns | 0.035 ns |
| Length of Connection Net 500μ m | 0.1 ns | 0.068 ns | 0.18 ns | 0.11 ns | 0.23 ns | 0.148 ns |
| Length of Connection Net 800μ m | 0.14 ns | 0.09 ns | 0.27 ns | 0.17 ns | 0.3 ns | 0.22 ns |
| Length of Connection Net 1200μ m | 0.2 ns | 0.12 ns | 0.38 ns | 0.24 ns | 0.52 ns | 0.32 ns |

FIG. 4

CLOCK CIRCUIT WITH DELAY FUNCTIONS AND RELATED METHOD

BACKGROUND OF THE INVENTION

1. Field of the Invention

The present invention relates to a clock circuit, and more particularly, to a clock circuit with delay functions and a related delay method.

2. Description of the Prior Art

Clock balancing technology can be divided into the "inter-clock balancing" technology and the "intra-clock balancing" technology. Herein the inter-clock balancing technology aims at maintaining the same latency between two different clock trees in order to satisfy the requirements of setup times. While the intra-clock balancing technology aims at maintaining the same total delay time between different sub-trees among the same clock tree in order to balance this clock tree.

Recently a common approach is that adding delay units (e.g., buffers) one by one into the clock tree (or the sub-tree) having a shorter delay time, such that the clock tree (or the sub-tree) having the shorter delay time can be balanced. However, such an approach needs a larger number of delay units (e.g., buffers), which is not ideal for considerations to cost and layout. Moreover, each of the delay unit (e.g., buffer) has a minimum delay time, which results in a low delay resolution.

SUMMARY OF THE INVENTION

It is one of the objectives of the claimed invention to provide a clock circuit with delay functions and a related delay method to solve the abovementioned problems.

It is one of the objectives of the claimed invention to provide a clock circuit and a related method for saving delays and/or for increasing its delay resolution by making use of the delay time caused by connection nets.

According to one embodiment, a clock circuit with delay functions is provided. The clock circuit includes a first clock tree and a delay module. The first clock tree provides a first clock signal, and includes a first clock root and a plurality of first sub-trees. The delay module is coupled to the first clock root or a designated sub-tree among the plurality of first sub-trees, for delaying the first clock signal. The delay module has at least two delay segments. Each delay segment has a delay and a connection net, wherein a delay time caused by each delay segment is substantially the same.

According to another embodiment, a delay method applied to a clock circuit is provided. The delay method includes the steps of: providing a first clock signal; and making use of a delay module to delay the first clock signal, wherein the delay module comprises at least two delay segments, and each delay segment has a delay and a connection net. Herein a delay time caused by each delay segment is substantially the same.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a delay time table illustrating the delay times caused by different delays allocating connection nets with different lengths.

DETAILED DESCRIPTION

Figure 1:
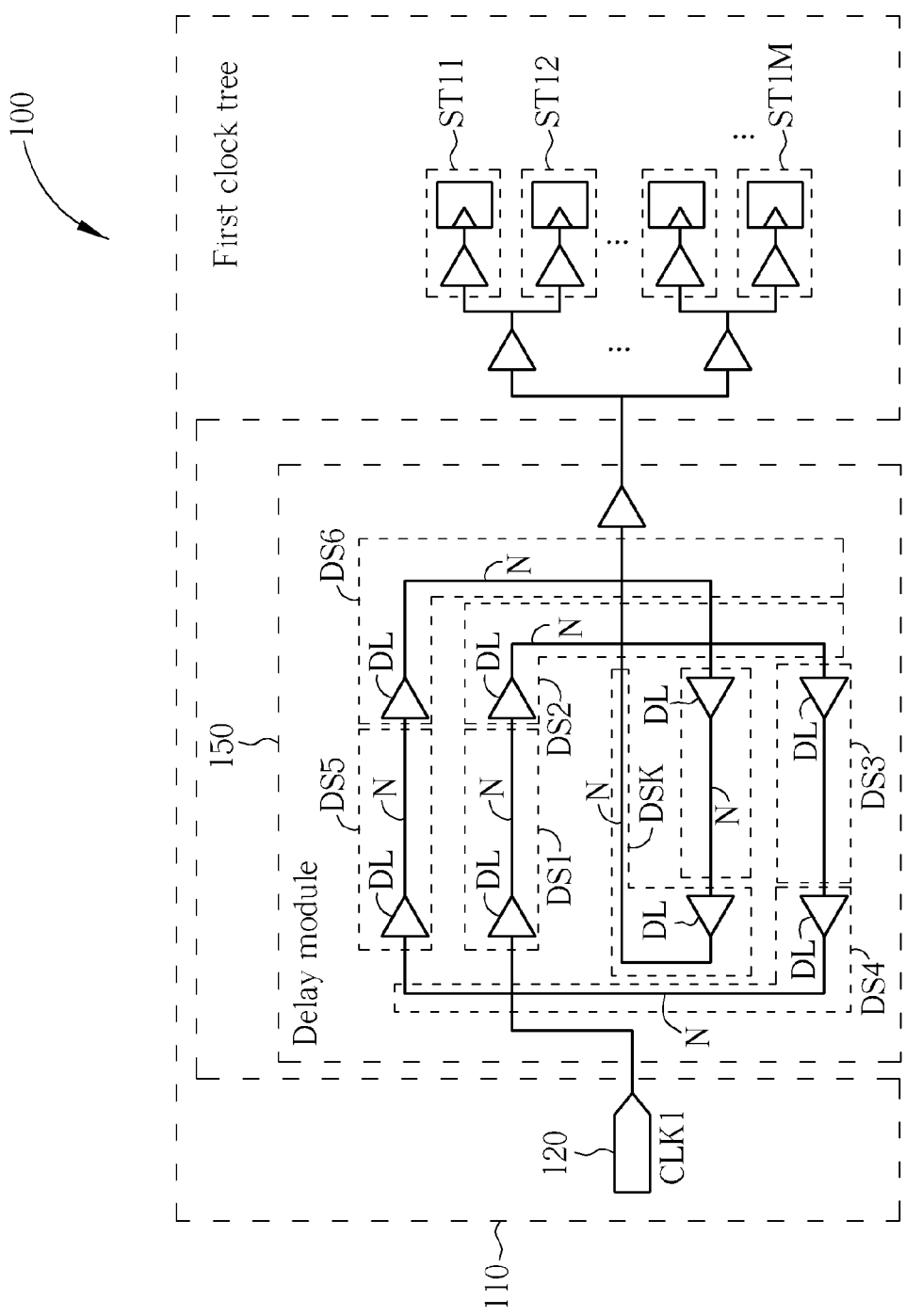
FIG. 1 is a diagram showing a clock circuit with delay functions according to a first embodiment of the present invention.

FIG. 1 is a diagram of a clock circuit 100 with delay functions according to a first embodiment of the present invention. The clock circuit 100 includes a first clock tree 110 for providing a first clock signal CLK1 and a delay module 150. The first clock tree 110 comprises a first clock root 120 and at least two first sub-trees (e.g., the first sub-trees ST11~ST1M). In the embodiment, the delay module 150 is coupled to the first clock root 120 for delaying the first clock signal CLK1, but this should not be considered as limitations of the present invention. In other embodiments, the delay module 150 can be coupled to a designated sub-tree of the first sub-trees ST11~ST1M as well, wherein a total delay time of the designated sub-tree is the shortest one of the first sub-trees ST11~ST1M. As shown in FIG. 1, the delay module 150 comprises a plurality of delay segments DS1~DSK, each of the delay segments DS1~DSK has a delay DL and a connection net N. What calls for special attention is that a delay time caused by each of the delay segments DS1~DSK is substantially the same, and a length of the connection net N is directly proportional to a driving ability of the delay DL. The relationship between the length of the connection net N and the driving ability of the delay DL will be detailed in the following embodiments.

Figure 2:
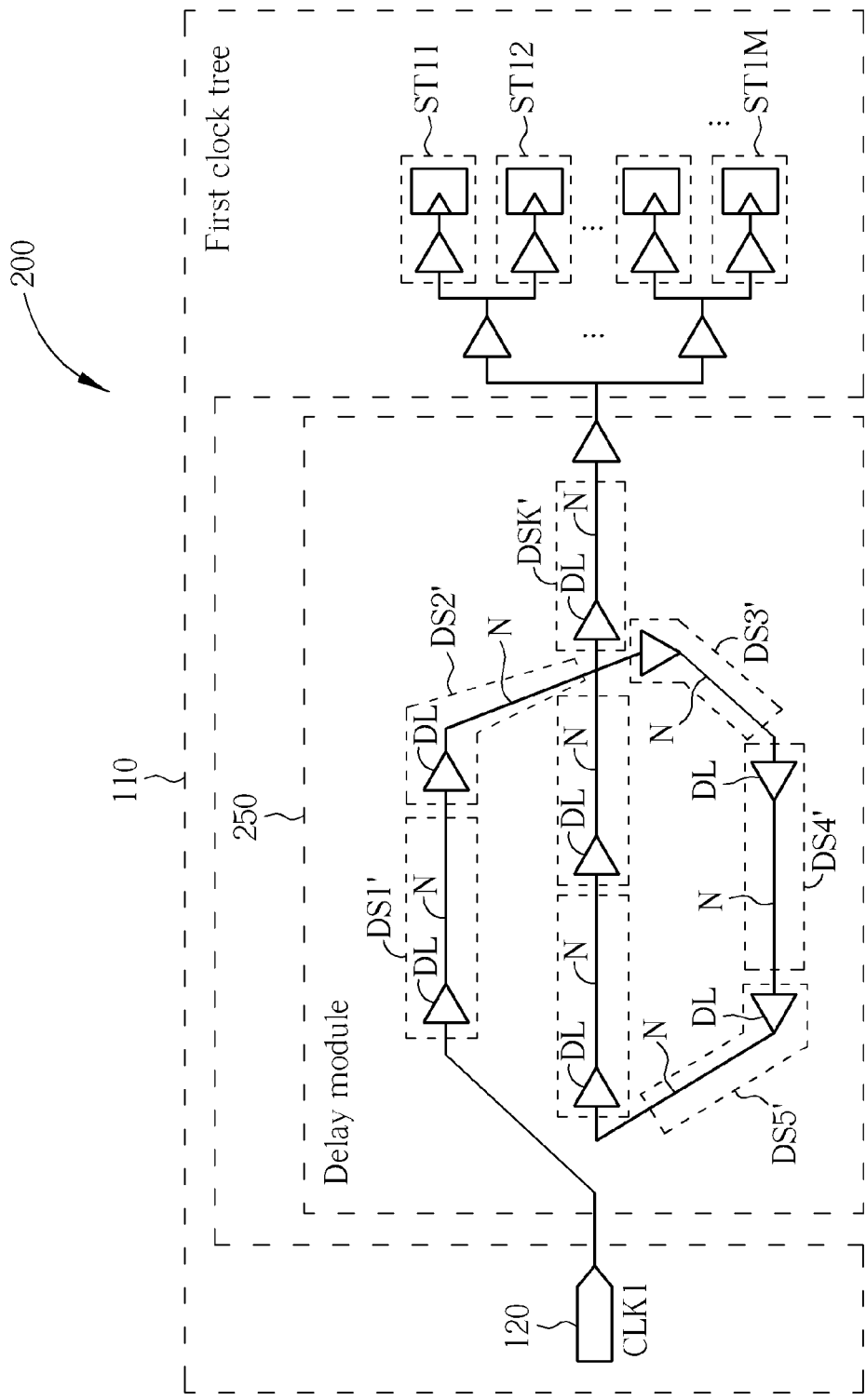
FIG. 2 is a diagram showing a clock circuit with delay functions according to a second embodiment of the present invention.

Please note that in the abovementioned embodiment, the delay segments DS1~DSK of the delay module 150 are arranged in a spiral type, but this is not a limitation of the present invention. Referring to FIG. 2, FIG. 2 is a diagram showing a clock circuit 200 with delay functions according to a second embodiment of the present invention. The architecture of the clock circuit 200 shown in FIG. 2 is similar to the clock circuit 100 shown in FIG. 1, and the difference between them is that a plurality of delay segments DS1'~DSK' of the delay module 250 are arranged in a ring type. It can be seen from this that a number of the plurality of delay segments included in the delay module and a shape arranged by them are not limited.

Figure 3:
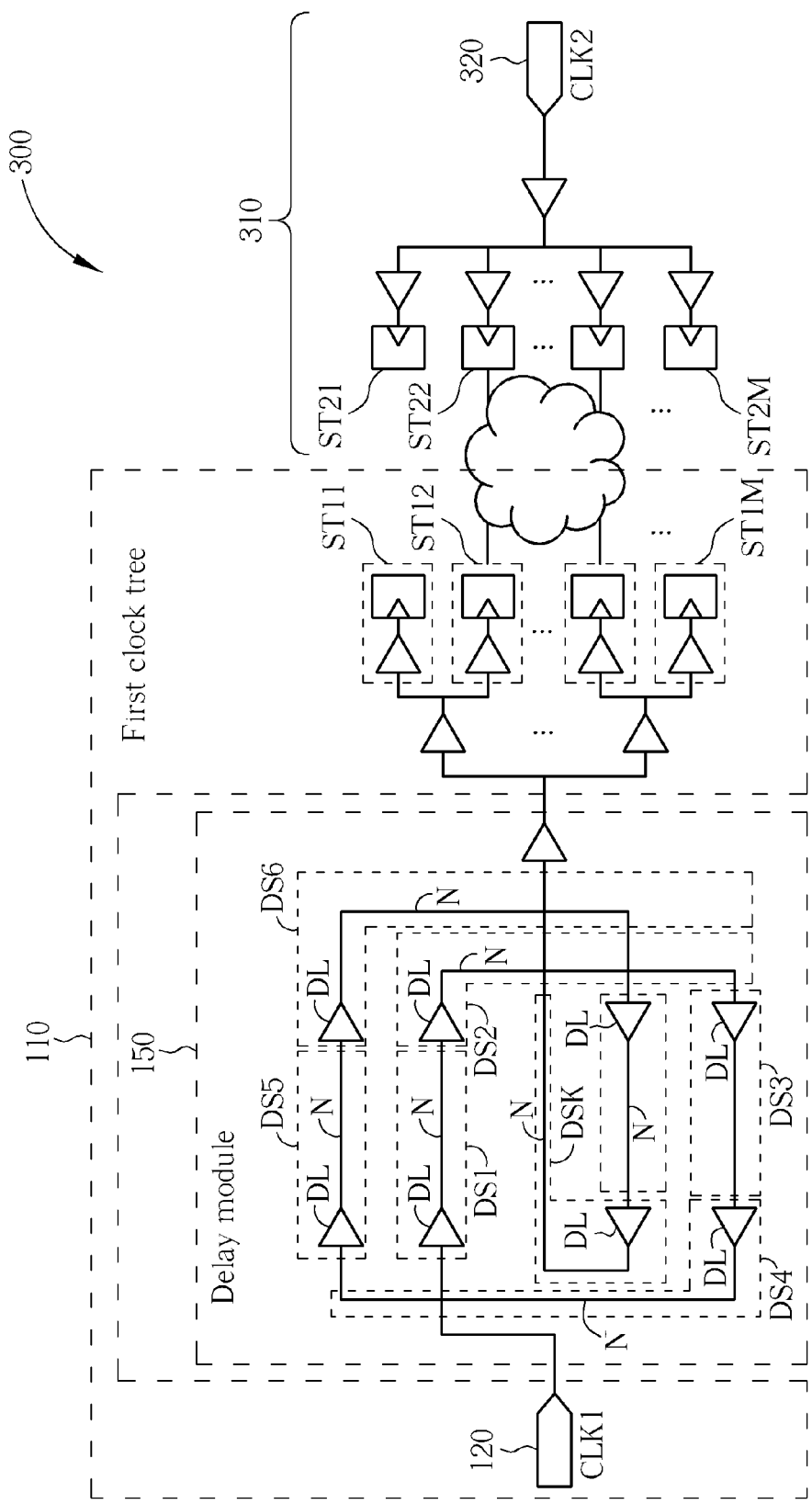
FIG. 3 is a diagram showing a clock circuit with delay functions according to a third embodiment of the present invention.

Please refer to FIG. 3. FIG. 3 is a diagram showing a clock circuit 300 with delay functions according to a third embodiment of the present invention. The architecture of the clock circuit 300 is similar to the clock circuit 100, the difference between them is that the clock circuit 300 further includes a second clock tree 310 for providing a second clock signal CLK2. The second clock tree 310 has a second clock root 320 and a plurality of second sub-trees ST21~ST2M. In this embodiment, the delay module 150 is coupled to the first clock root 120 for adjusting a latency between the first clock signal CLK1 and the second clock signal CLK2, such that there is a designated phase difference existed between the first clock signal CLK1 and the second clock signal CLK2. For example, the first clock signal CLK1 and the second clock signal CLK2 are in phase, out of phase, or having a phase difference of 90 degrees. Obviously, those skilled in the art should appreciate that various modifications of the clock circuits 100~300 mentioned in FIG. 1~FIG. 3 may be made without departing from the spirit of the present invention. As an illustration, the clock circuits mentioned in FIG. 1~FIG. 3 can be randomly arranged and combined to form a new varied embodiment, which also belongs to the scope of the present invention.

What calls for special attention is that the first embodiment and the second embodiment mentioned above are suitable for the intra-clock balancing technology, which are aimed at maintaining the same total delay time between different sub-trees among the same clock tree in order to balance the clock tree. While the aforementioned third embodiment is suitable for the inter-clock balancing technology, which is aimed at maintaining the same latency between different clock trees in order to satisfy requirements of setup times.

Please refer to FIG. 4. FIG. 4 is a delay time table illustrating the delay times caused by different delays allocating connection nets with different lengths. In this embodiment, three delays labeled as INVCKQHD, INVCKNHD, and INVCKNHD are cited as examples, wherein each of the three delays is an inverter adopting the 0.11 μm manufacturing process. The inverters INVCKNHD and INVCKNHD are the most suitable types of inverters among them, because their sizes are not too large and are about half of the inverter INVCKQHD. As far as the inverters INVCKNHD and INVCKNHD are concerned, the most suitable length for their connection nets is substantially 500~800 μm. Since their transition time is less than 0.3 ns, the delay time caused by each delay segment (including a delay and a connection net) will not be affected by signal integrity (SI). Furthermore, the delay time caused by a connection net with a length equaling 500~800 μm is about 3.5~6.2 times of the delay time caused by a connection net with a length equaling 0 μm. For this reason, each segment (including a delay and a connection net with a length equaling 500~800 μm) may be able to save 2.5~5.2 delays when compared with a single delay is used alone. As far as integrated circuit (IC) layout is concerned, layout engineers can easily layout their required delay times without depending upon a pre-defined table (e.g., the delay time table shown in FIG. 4). As an illustration, if a delay time of 0.24 ns is required, two units of "the inverter INVCKQHD plus a connection net with a length equaling 1200 μm" can be adopted, or one unit of "the inverter INVCKNHD plus a connection net with a length equaling 1200 μm" can be adopted. Certainly, the more different types of delay time units, the more easily to design the required delay times. In other words, its resolution is not limited by the delay time of the delays (normally 0.03 ns). For example, the delay time for "the inverter INVCKQHD plus a connection net with a length equaling 0 μm" is 0.029 ns, while the delay time for "the inverter INVCKQHD plus a connection net with a length equaling 100 μm" is about 0.039 ns, and its resolution is about 0.01 ns (namely, 0.039−0.029=0.01).

Please note that the abovementioned delay can be implemented by an inverter or a buffer, but the present invention is not limited to this only and other elements can be adopted to implement such delay. What is more, the 0.11 μm manufacturing process is presented merely for describing the present invention, and in no way should be considered as limitations of the present invention.

From the descriptions mentioned above, it can be seen that each delay segment of a delay module includes a delay and a connection net, wherein the delay time caused by each delay segment is substantially the same, and a length of the connection net is directly proportional to a driving ability of the delay. As a result, by making use of the connection net with equal-length to replace the delay time caused by the delay, the number of the delays can be saved. In addition, the plurality of delay segments included in the delay module can be arranged in a ring type or a spiral type, such that allocations for layout can be benefited in order to achieve the goal of saving costs and saving areas.

Figure 5:
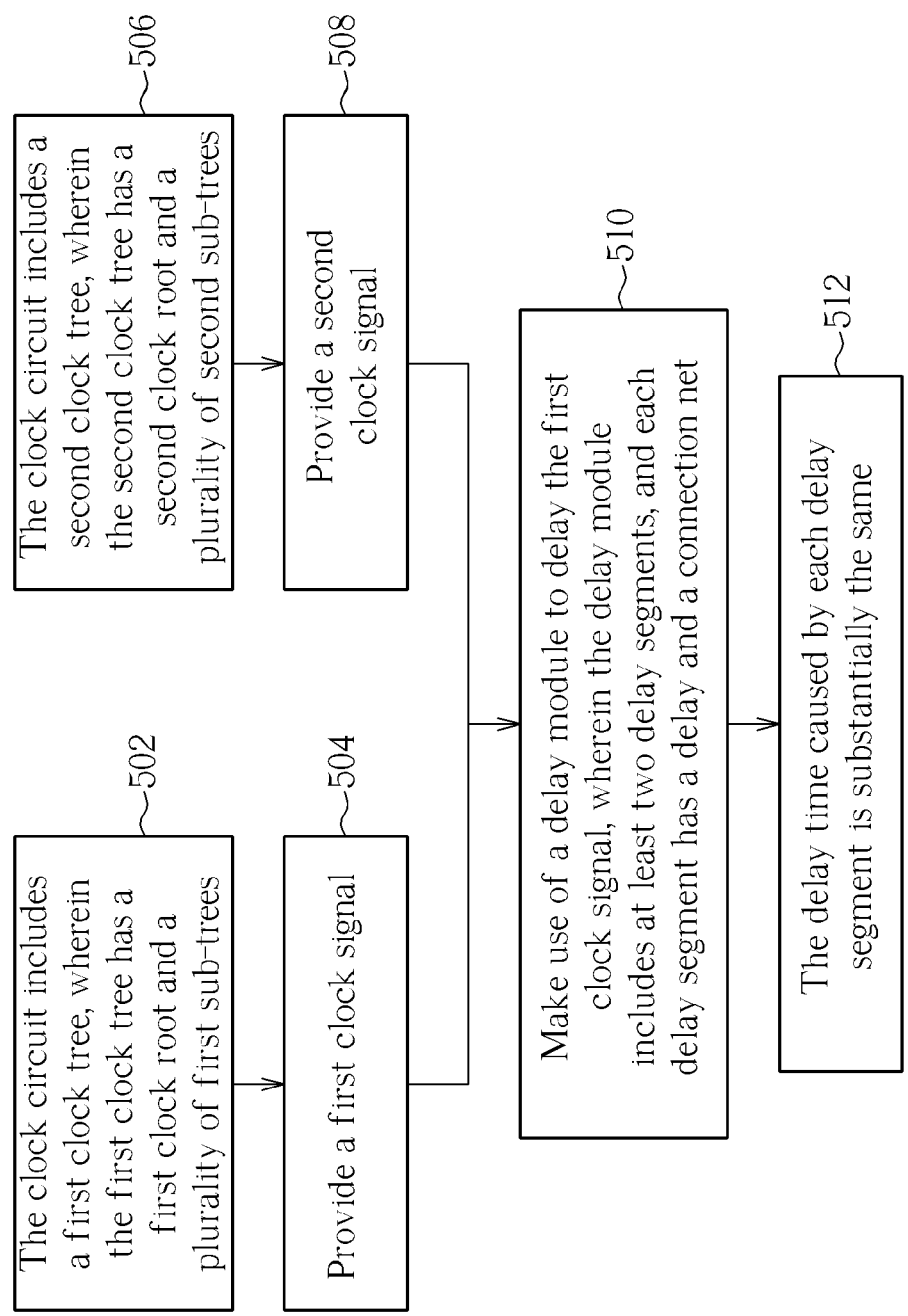
FIG. 5 is a flowchart for illustrating a delay method applied to a clock circuit according to an exemplary embodiment of the present invention.

Please refer to FIG. 5. FIG. 5 is a flowchart for illustrating a delay method applied to a clock circuit according to an exemplary embodiment of the present invention. Those skilled in the art should be able to find the corresponding steps by reference to the embodiments described in FIG. 1, FIG. 2 and FIG. 3, and further description is omitted here for brevity. Please note that, the steps of the abovementioned flowchart are presented merely for describing the present invention, and in no way should be considered to be limitations of the scope of the present invention. Those skilled in the art should observe that the method shown in FIG. 5 can include other intermediate steps or several steps can be merged into a single step without departing from the spirit of the present invention.

The abovementioned embodiments are presented merely for describing the features of the present invention, and in noway should be considered to be limitations of the scope of the present invention. In summary, the clock circuit with delay functions disclosed in the present invention is not only suitable for the inter-clock balancing technology but also suitable for the intra-clock balancing technology. Since the delay time caused by each delay segment is substantially the same, the connection net with equal-length can be used for replacing the delay time caused by the delay in order to save the number of the delays. Additionally, the length of the connection net can be appropriately adjusted depending upon the types of the delays, the driving ability of the delays, and the manufacturing processes of the delays. What is more, the plurality of delay segments of the delay module can be arranged in a ring type or a spiral type, such that the goal of saving costs and saving areas can be achieved.

Those skilled in the art will readily observe that numerous modifications and alterations of the device and method may be made while retaining the teachings of the invention.

What is claimed is:

1. A clock circuit with delay functions, comprising:
 a first clock tree, providing a first clock signal, the first clock tree comprising:
 a first clock root; and
 a plurality of first sub-trees; and
 a delay module, coupled to the first clock root or a designated sub-tree among the plurality of first sub-trees, for delaying the first clock signal, the delay module comprising:
 at least two delay segments, each delay segment comprising a delay and a connection net, wherein a delay time caused by each delay segment is substantially the same, and wherein a length of the connection net is directly proportional to a driving ability of the delay.

2. The clock circuit of claim 1, wherein the delay module is coupled to the designated sub-tree, and a total delay time of the designated sub-tree is the shortest among the plurality of first sub-trees.

3. The clock circuit of claim 1, further comprising:
 a second clock tree, providing a second clock signal;
 wherein the delay module is coupled to the first clock root, for adjusting a latency between the first clock signal and the second clock signal.

4. The clock circuit of claim 1, wherein a length of the connection net is substantially 500~1200μm.

5. The clock circuit of claim 1, wherein the at least two delay segments are arranged in a ring type.

6. The clock circuit of claim 1, wherein the at least two delay segments are arranged in a spiral type.

7. The clock circuit of claim 1, wherein the at least two delay segments are determined according to a delay time table.

8. The clock circuit of claim 1, wherein the at least two delay segments respectively have a delay time, and the delay time is corresponding to a driving ability of the delay as well as a length of the connection net.

9. A delay method applied to a clock circuit, the delay method comprising:
providing a first clock signal; and
making use of a delay module to delay the first clock signal, wherein the delay module comprises at least two delay segments, and each delay segment has a delay and a connection net, wherein a length of the connection net is directly proportional to a driving ability of the delay, and wherein a delay type of each delay and the length of the connection net correspond to a required delay time;
wherein a delay time caused by each delay segment is substantially the same.

10. The delay method of claim 9, wherein each delay is embodied as an inverter, and where the delay type of each delay corresponds to an inverter type.

11. The delay method of claim 10, wherein the inverter is manufactured according to a 0.11 μm manufacturing process.

12. The delay method of claim 9, wherein the clock circuit comprises at least a first clock tree, the first clock tree comprises a first clock root and a plurality of first sub-trees, and the step of making use of the delay module to delay the first clock signal comprises:
making use of the delay module to adjust a latency between the plurality of first sub-trees, wherein the delay module is coupled to the designated sub-tree among the plurality of first sub-trees, and a total delay time of the designated sub-tree is the shortest among the plurality of first sub-trees.

13. The delay method of claim 9, further comprising:
providing a second clock signal; and
the step of making use of the delay module to delay the first clock signal comprises:
making use of the delay module to adjust at least one latency between the first clock signal and the second signal, such that there is a designated phase difference existed between the first clock signal and the second signal.

14. The delay method of claim 9, wherein the at least two delay segments are determined according to a delay time table.

15. The delay method of claim 9, wherein the at least two delay segments respectively have a delay time, and the delay time is corresponding to a driving ability of the delay as well as a length of the connection net.

16. The delay method of claim 9, wherein the at least two delay segments are arranged in a ring type or a spiral type.

17. A clock circuit with delay functions, comprising:
a first clock tree, for providing a first clock signal; and
a delay module, coupled to the first clock tree, for delaying the first clock signal, the delay module comprising:
at least one delay segment, each delay segment having a delay time, wherein each delay segment comprises a delay and a connection net, wherein the delay time of the delay segment corresponds to a driving ability of the delay and a length of the connection net, and wherein a number of delay segments corresponds to a required delay time.

18. The clock circuit of claim 17, wherein the at least two delay segments are determined according to a delay time table.

19. The clock circuit of claim 17, wherein the at least one delay segment comprises a first delay segment and a second delay segment.

20. The clock circuit of claim 19, wherein a delay time caused by each delay segment is substantially the same.

21. The clock circuit of claim 17, further comprising:
a second clock tree, for providing a second clock signal;
wherein the delay module is used for adjusting at least one latency between the first clock signal and the second signal, such that there is a designated phase difference existed between the first clock signal and the second signal.

22. A delay method applied to a clock circuit, the delay method comprising:
providing a first clock signal;
determining a delay module based on delay size, connection net length, and delay time information specified in a delay time table; and
receiving the first clock signal by the delay module to delay the first clock signal, wherein the delay module comprises at least a delay and at least a connection net.

23. The delay method of claim 22, wherein the delay module has a delay time, and the delay time is corresponding to a driving ability of the delay and a length of the connection net.

24. The delay method of claim 22, further comprising:
providing a second clock signal; and
making use of the delay module to adjust at least one latency between the first clock signal and the second signal, such that there is a designated phase difference existed between the first clock signal and the second signal.

* * * * *